(No Model.)

J. L. NEWELL.
SPECTACLE FRAME.

No. 365,090. Patented June 21, 1887.

Witnesses.
Thos. H. Hutchins,
Wm. J. Hutchins.

Inventor.
James L. Newell.

UNITED STATES PATENT OFFICE.

JAMES L. NEWELL, OF JOLIET, ILLINOIS.

SPECTACLE-FRAME.

SPECIFICATION forming part of Letters Patent No. 365,090, dated June 21, 1887.

Application filed September 1, 1886. Serial No. 212,352. (No model.)

*To all whom it may concern:*

Be it known that I, JAMES L. NEWELL, a citizen of the United States of America, residing at Joliet, in the county of Will and State of Illinois, have invented certain new and useful Improvements in Spectacle-Frames, of which the following is a specification, reference being had therein to the accompanying drawings.

This invention relates to certain improvements in spectacle-frames, the construction and operation of which are fully set forth and explained in the following specification and claims, reference being had to the accompanying drawings and the letters and figures of reference thereon, making a part of this specification, in which—

Figure 1:
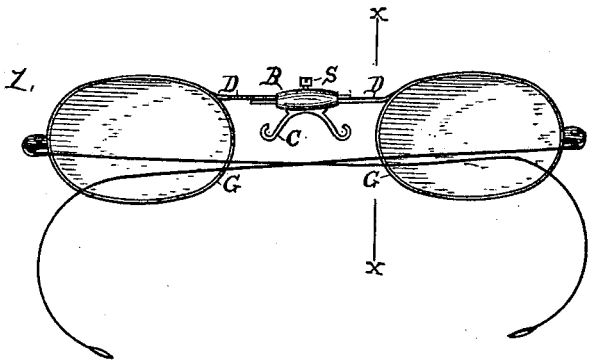
Figure 2:
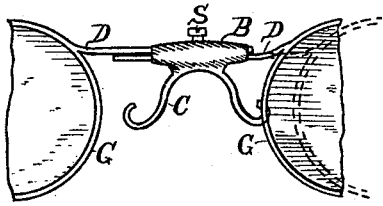
Figure 3:
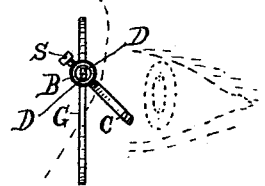
Figure 4:
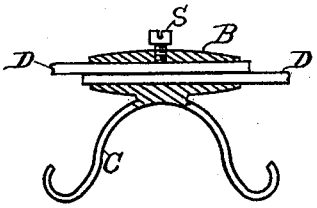

Figure 1 is a perspective view of the spectacle-frame and its lenses. Fig. 2 is a side view of the central portion of the spectacle-frame, showing in dotted lines how it is adjustable as to length. Fig. 3 is a cross-sectional view of the spectacle-frame about on line $x$ of Fig. 1, and Fig. 4 is a central vertical longitudinal section of the sleeve for coupling the two parts of the spectacle-frame together at the center in such manner that the frame is adjustable as to length.

Referring to the drawings, D D represent outwardly-extending arms integral with the bows G G, and which arms are adapted to be inclosed within the sleeve B, having a set-screw, S, for securing said arms therein. Said sleeve B is provided with a bridge, C, for resting on the bridge of the wearer's nose.

The lenses may be adjustably arranged to or from each other to accommodate them to the eyes of the wearer by loosening said set-screw and moving said arms therein, and when the lenses are placed the proper distance apart secured in such position by means of said set-screw. The said sleeve B, with the bridge C attached, may be moved at one side from the center, or nearer one lense than the other, for adjustment to the nose of a person where, from an injury or from natural causes, the bridge of the nose is not centrally located between the eyes, as is shown in Fig. 2; also, the said sleeve and bridge are rotatable on said arms, and thus permit the said bridge to project at any desired angle from the spectacle-frame for the accommodation of the wearer, as is shown in Fig. 3. By this construction the frame of the spectacle is not only made adjustable as to length, but the bridge is capable of being located at the proper place between the eyes of the wearer to accommodate the frame to deformed or injured noses, as stated, and by having the bridge rotatable it may be so arranged as to be more comfortable to the wearer. It is principally in these two last-named features that my invention lies, as I am aware it is not new to adjust the lenses to or from each other.

Having thus described my invention, what I claim as new, and desire to secure by Letters Patent, is as follows, to wit:

1. The spectacle-frame shown and described, consisting of the combination of the bows G G, having the arms D D, and sleeve B, having the bridge C and set-screw S, as and for the purpose set forth.

2. The spectacle-frame consisting of the bows G G, having the arms D D, in combination with the sleeve B, having the bridge C and set-screw S, and adapted to inclose and adjustably connect said arms, and for adjusting the bridge C laterally between the lenses, substantially as and for the purpose set forth.

JAMES L. NEWELL.

Witnesses:
THOS. H. HUTCHINS,
WM. J. HUTCHINS.